United States Patent
Faerber et al.

(10) Patent No.: US 8,500,193 B2
(45) Date of Patent: Aug. 6, 2013

(54) VEHICLE ROOF HAVING DRIVE CARRIAGE FOR COVER ELEMENT

(75) Inventors: Manfred Faerber, Wielenbach (DE); Lloyd George Racine, Shelby Township, MI (US); Tsukasa Butsuen, Higashi-Hiroshima (JP)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 13/148,627

(22) PCT Filed: Jan. 21, 2010

(86) PCT No.: PCT/DE2010/000064
§ 371 (c)(1),
(2), (4) Date: Nov. 30, 2011

(87) PCT Pub. No.: WO2010/099768
PCT Pub. Date: Sep. 10, 2010

(65) Prior Publication Data
US 2012/0068501 A1  Mar. 22, 2012

(30) Foreign Application Priority Data

Mar. 3, 2009  (DE) .......................... 10 2009 011 472

(51) Int. Cl.
*B60J 7/05* (2006.01)
(52) U.S. Cl.
USPC ............................ 296/221; 296/222; 296/223
(58) Field of Classification Search
USPC .......................................... 296/221, 222, 223
See application file for complete search history.

(56) References Cited

U.S. PATENT DOCUMENTS

| 4,647,104 | A  | * | 3/1987  | Kohlpaintner et al. ....... 296/221 |
| 6,290,289 | B1 |   | 9/2001  | Ohtsu et al. |
| 7,025,414 | B2 |   | 4/2006  | Hanke |
| 7,425,033 | B2 | * | 9/2008  | Regnier et al. ................ 296/223 |
| 7,644,980 | B2 | * | 1/2010  | Hager et al. ................... 296/223 |
| 7,810,879 | B2 | * | 10/2010 | Nakamura ..................... 296/221 |
| 2006/0284450 | A1 | | 12/2006 | Regnier et al. |

FOREIGN PATENT DOCUMENTS

| CN | 101218117 A   | 7/2008 |
| DE | 10024829 A1   | 5/2001 |
| DE | 10146284 A1   | 4/2003 |
| DE | 102006060369 A1 | 6/2008 |
| EP | 2017108 A1    | 1/2009 |
| JP | 2000-335249 A | 12/2000 |

OTHER PUBLICATIONS

International Search Report for PCT/DE2010/000064 dated May 28, 2010.

* cited by examiner

*Primary Examiner* — Dennis Pedder
(74) *Attorney, Agent, or Firm* — Marshall Gerstein & Borun LLP (57) ABSTRACT

A vehicle roof having at least one cover element, which selectively closes or at least partially exposes a roof opening and which, with respect to a vehicle longitudinal center plane, comprises a carrier element on either side, the carrier element comprising a guide web that interacts with an adjusting device that is guided in a guide rail and comprises a drive carriage, which interacts with the guide web at least to pivot the cover element and comprises a guide element on which the guide web rests. When moving the cover element in the vehicle longitudinal direction, each guide element of the drive carriages serves as a dog element, which engages in a corresponding dog recess configured at the respectively associated carrier element of the cover element.

6 Claims, 10 Drawing Sheets

VEHICLE ROOF HAVING DRIVE CARRIAGE FOR COVER ELEMENT

BACKGROUND OF THE INVENTION

1. Field of the Invention

The invention relates to a vehicle roof with at least one cover element which optionally closes or at least partially opens up a roof opening.

2. Related Technology

A vehicle roof of this type is known from practice and comprises a cover element which has carrier element along both of the lateral edges thereof with respect to a longitudinal center plane of the vehicle, the carrier element constituting a pivoting or deployment arm for the cover element. Guide rails are arranged, in a manner fixed to the roof, along the lateral edges of the roof opening, in each of which guide rails one of the carrier elements is guided displaceably when the cover element is actuated. Furthermore, a drive carriage is guided in each of the guide rails, the drive carriage, in order to pivot the cover element, interacting with a guide web which is arranged on the respectively assigned carrier element of the cover element. The guide web forms a curved track or control track such that movement of the drive carriage is in the longitudinal direction of the vehicle causing pivoting of the cover element. In particular, the cover element can be pivoted between a closed position, in which the roof opening is completely closed, a ventilation position, in which a rear edge of the cover element is deployed in relation to a rear, fixed roof section, and a displacement position, in which the cover element can be moved in the longitudinal direction of the vehicle under the rear, fixed roof section in order to open up the roof opening. The cover element is secured against moving in the longitudinal direction of the vehicle during the pivoting operation by a locking lever which interacts with a recess formed on the respective guide rail.

SUMMARY OF THE INVENTION

The invention provides a vehicle roof of the type described above, which is distinguished by a small number of components.

Accordingly, the invention provides a vehicle roof with at least one cover element that optionally closes or at least partially opens uP a roof opening and has a carrier element on two sides of a longitudinal center plane of the vehicle, the carrier element comprising a guide web that interacts with a displacement device that is guided in a guide rail and comprises a drive carriage, which interacts with the guide web at least to pivot the cover element and comprises a guide element on which the guide web rests, wherein, as the cover element moves in the longitudinal direction of the vehicle, each guide element of the drive carriage serves as a carry-along element that engages in a corresponding carry-along recess formed on the respectively assigned carrier element of the cover element.

The core of the invention consequently consists in that the drive carriages of the vehicle roof each have a guide element on which the respectively assigned guide web slides during pivoting of the cover element and which also serves to move the cover element in the longitudinal direction of the vehicle by engagement in a corresponding recess on the cover carrier thereof as carry-along element. The cover element carrier therefore does not have to be transferred to various switching and guide elements of the driving kinematics. On the contrary, the control upon actuation of the cover element, i.e. upon lowering and moving the cover element, can be carried out in a movement sequence. All that is required in order to actuate the cover element is the drive carriage of the dual-function guide or carry-along element thereof and the cover element carrier which is fixed to the cover and has the guide web and the carry-along recess. The system according to the invention can therefore have a small number of components, which has a positive effect with regard to installation times, with regard to costs and also with regard to component tolerances. Since, as already mentioned above, when opening or closing the roof opening of the vehicle roof according to the invention there does not have to be any transfer between various switching elements of the cover drive, there are also advantages with regard to the configuration of an anti-jamming system since the latter does not have to process any differentiated force values here.

The vehicle roof according to the invention has a cost-effective, preferably single-part cover element carrier. An additional control part, such as a control lever, for switching the various pivoted positions of the cover element is not required. Since there is no control part, the guide rail also does not require milling processes which may be costly and are otherwise required for this purpose. The web guide which is realized by means of the guide web is furthermore distinguished by a low overall height which constitutes an exact switching mechanism with a kinematically precise configuration. Up to a switch being made from the pivoting operation into the moving operation, as the drive carriage moves, the cover element slowly moves downward into the lowered displacement position thereof. As the cover element moves in the longitudinal direction of the vehicle, there is a large overlap in the vertical direction of the vehicle between the guide element formed on the drive carriage and the carry-along recess. It is also possible for force to be introduced into the cover element carrier in a sheet-like manner as the latter moves in the longitudinal direction of the vehicle.

In a preferred embodiment of the vehicle roof according to the invention, the carry-along recesses are each formed by a plastic insert molding of the respective carrier element, said plastic insert molding also forming the guide web formed on the respective carrier element. The carry-along recesses are consequently an integral part of the respective guide web. In particular, as the cover element pivots into the lowered displacement position thereof, the guide element serving as the carry-along element enters the carry-along recess at the end of the pivoting operation such that further movement of the drive carriage in the direction of the vehicle rear leads to the cover element moving in the direction of the vehicle rear. When the cover element moves from the open position into the closed position thereof, the movement sequence takes place the other way around, i.e. first of all the cover element is displaced in the direction of the vehicle front by the guide element engaging in the carry-along recess and then the guide element slides further along the guide web such that the cover element is pivoted upward into the closed position thereof.

In order to ensure smooth-running entry of the guide element serving as the carry-along element into the assigned carry-along recess and a precise switching operation, in an advantageous embodiment of the vehicle roof according to the invention the carry-along recesses each have a front and a rear boundary surface which are each inclined in the direction of the vehicle rear and ensure a positionally precise entry and exit of the guide element into and out of the carry-along recess.

Since, in the region of the carry-along recess only small forces, if any at all, act in the vertical direction of the vehicle on the plastic insert molding, which forms the guide web and the carry-along recess, as the cover element moves in the longitudinal direction of the vehicle, in a preferred embodiment the plastic insert molding is tapered in the vertical direction of the vehicle in the region of the carry-along recess. The overall height of the carrier element can therefore be kept low. In particular, the carry-along recess can be formed by the tapering of the material.

In order to secure the cover element against moving in the direction of the extent of the guide rails, in an advantageous embodiment of the vehicle roof according to the invention at least one front locking element and at least one rear locking element are formed on each of the carrier elements of the cover element, which locking elements interact with the corresponding abutments which are fixed to the roof. When the cover element is moved in the longitudinal direction of the vehicle, the locking elements are preferably guided in a guide channel of the respective guide rail such that they then secure the cover element against pivoting.

The securing of the cover element against moving in the longitudinal direction of the vehicle can be realized in particular without additional components if the locking elements each interact with a cutout or recess of an upper wall of the respective guide rail. The edges of the recesses then each form the abutment which is fixed to the roof.

In a particularly cost-effective embodiment of the vehicle roof according to the invention, the drive carriages are each designed as a plastic injection molded part on which the respective guide element serving as the carry-along element is formed.

The drive carriages which are formed as a plastic injection molded part preferably each have a guide claw which is formed integrally, engages around the respectively assigned guide web and the base of which is formed by the guide or carry-along element.

BRIEF DESCRIPTION OF THE DRAWINGS

Further advantages and advantageous refinements of the subject matter of the invention can be gathered from the description, the drawing and the patent claims.

An exemplary embodiment of a vehicle roof according to the invention is illustrated in simplified form schematically in the drawing and is explained in more detail in the description below. In the drawing.

DETAILED DESCRIPTION

The drawing illustrates a vehicle roof 10 of a passenger vehicle, which is provided with a roof opening 12 which can optionally be closed or at least partially opened up by means of a cover element 14. The cover element 14 is part of a roof opening system, which is illustrated in detail with reference to FIGS. 2 to 10, and comprises a glass body 16 which is provided with a frame 18 which is formed from polyurethane foam and in which an inner cover panel 20 is embedded. The inner cover panel 20 has fastening tabs 22 which protrude downward at right angles from the glass body 16 and serve to connect the cover element 14 to cover element carriers 24 which are arranged on the lateral edges of the cover element 14 on both sides of a longitudinal center plane of the vehicle and are part of a displacement device for the cover element 14. The fastening tabs 22 are each screwed via a screw 23 to the respective cover element carrier 24.

Figure 1:
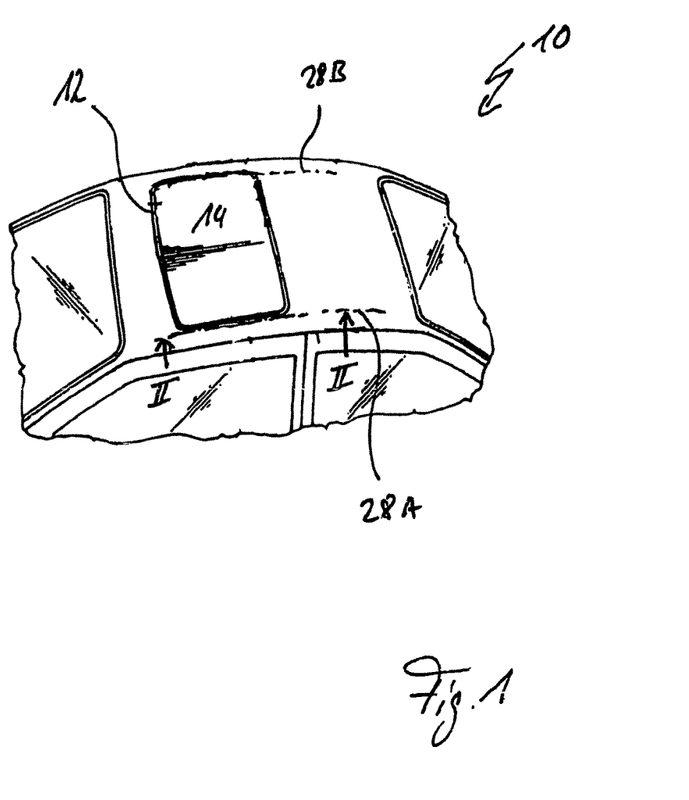
FIG. 1 shows a perspective top view of a vehicle roof according to the invention with a roof opening system.
Figure 2:
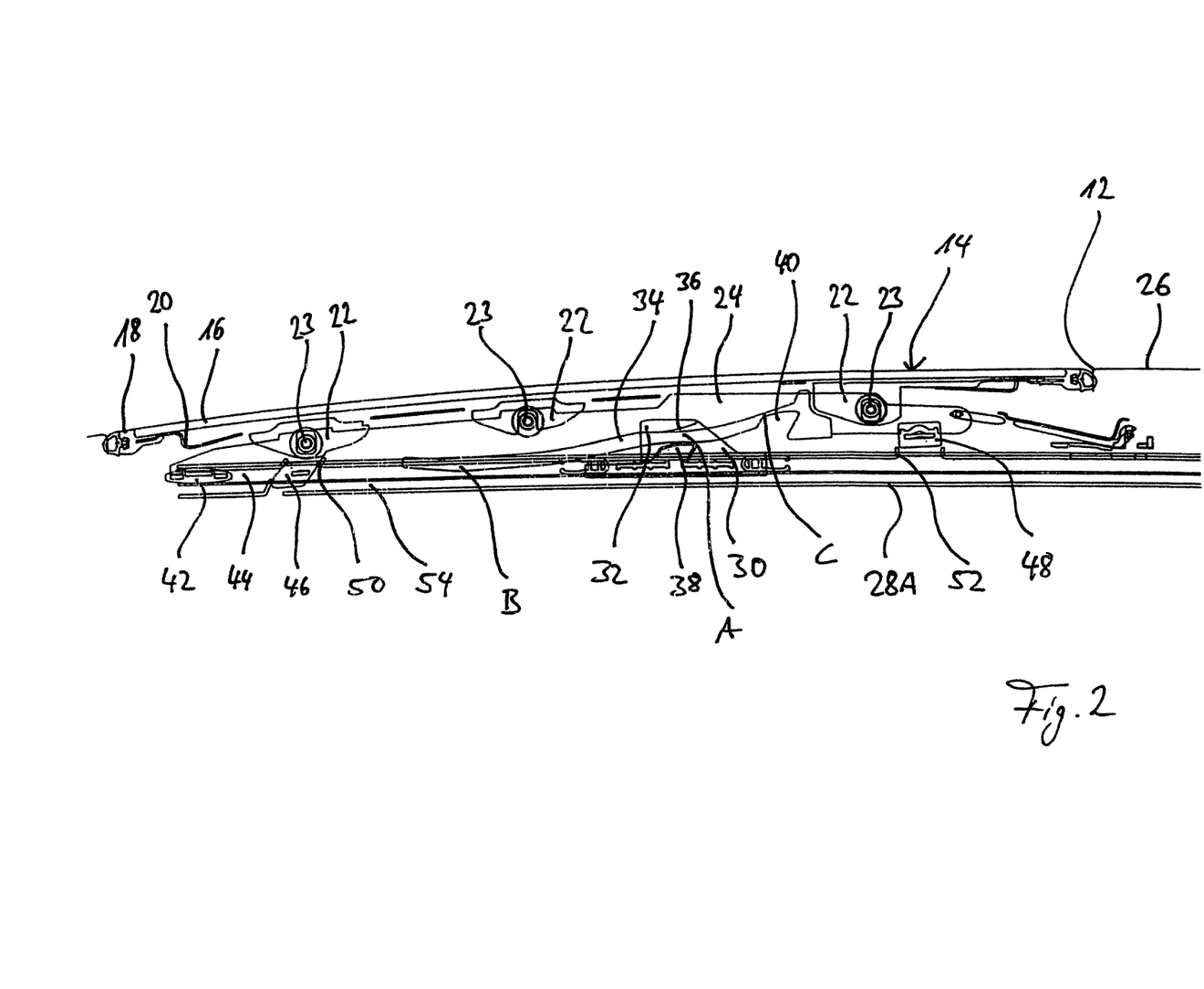
FIG. 2 shows a schematic longitudinal section through the roof opening system in the region of the driving mechanics thereof along the line II-II in FIG. 1 in the closed position of a cover element.
Figure 3:
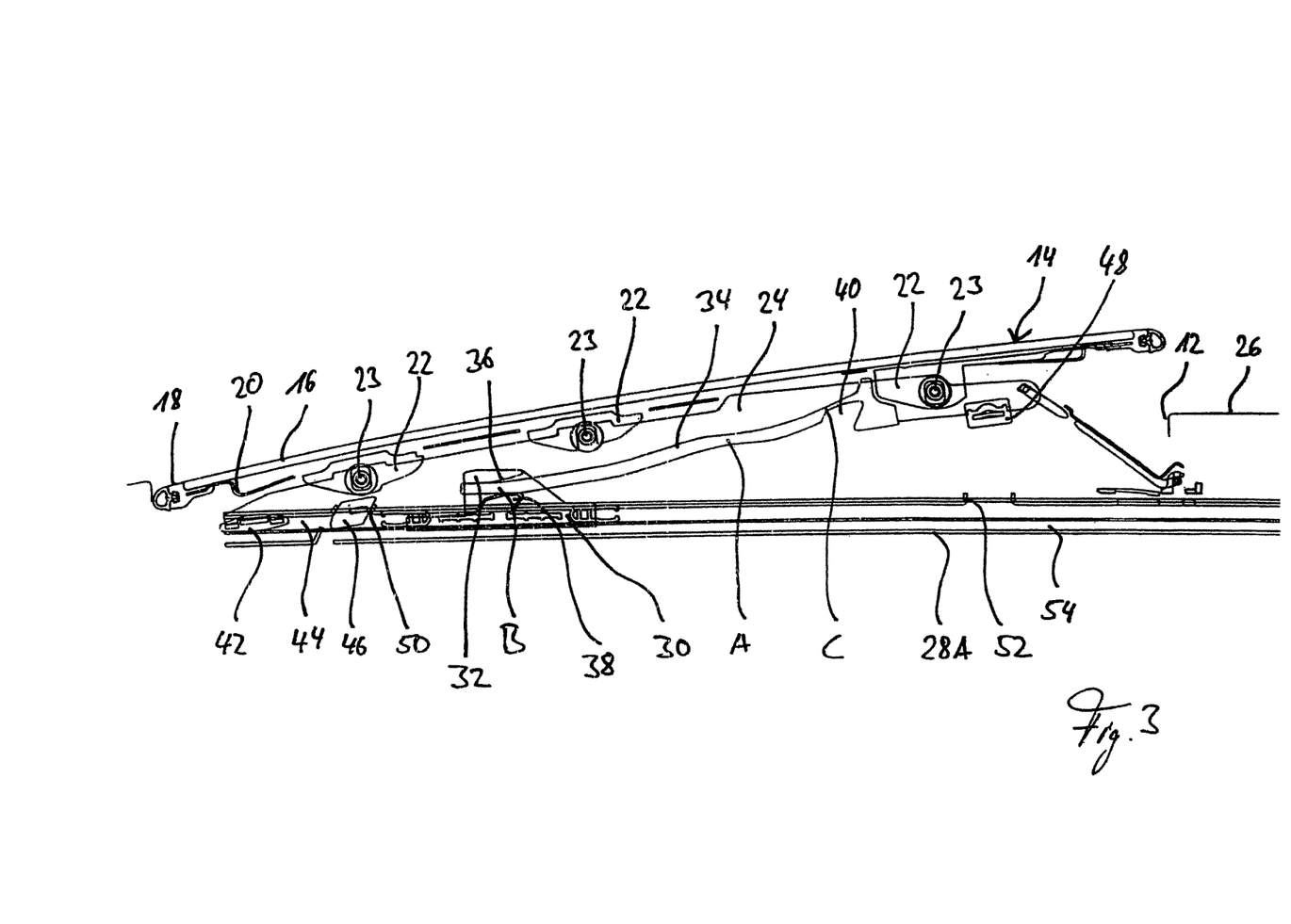
FIG. 3 shows a view corresponding to FIG. 2, but in the ventilation position of the cover element.
Figure 4:
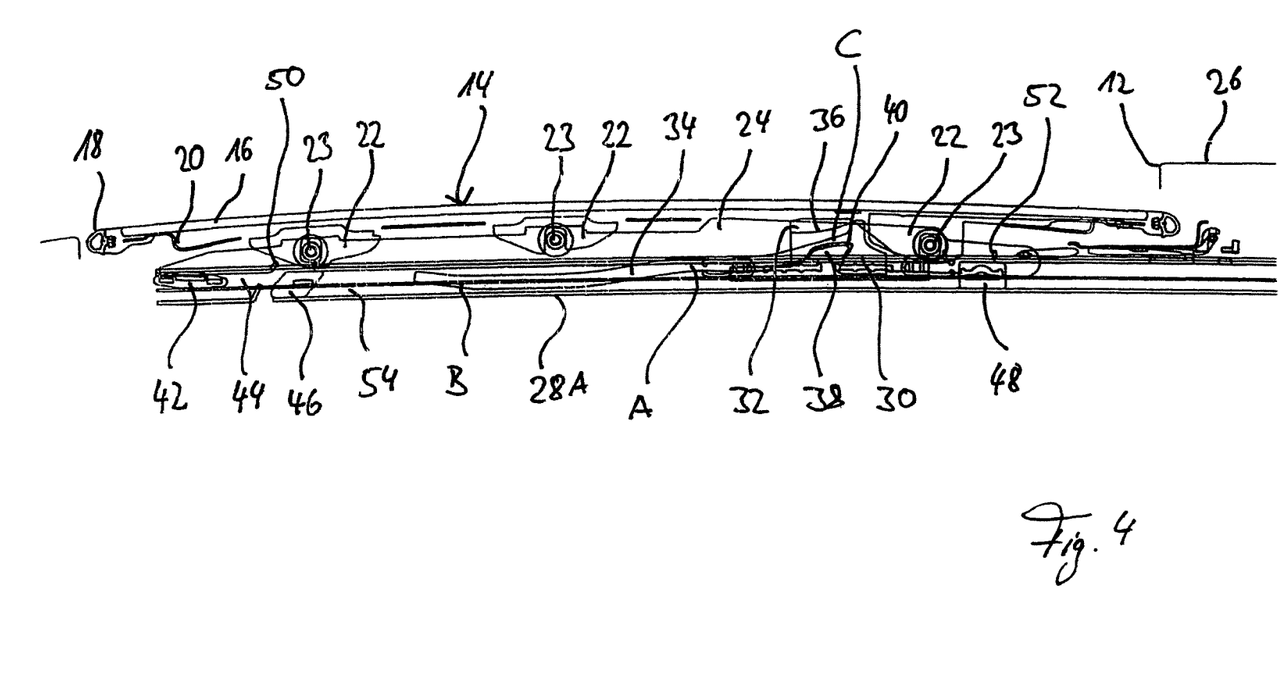
FIG. 4 shows a view corresponding to FIG. 2, but in a lowered displacement position of the cover element.

By means of the displacement device, the cover element can be pivoted between a closed position, which is illustrated in FIG. 2 and in which the roof opening 12 is closed, a ventilation position, which is illustrated in FIG. 3 and in which a rear edge of the cover element 14 is deployed in relation to a rear fixed roof section 26, and a lowered displacement position, which is illustrated in FIG. 4 and in which the cover element 14 can be moved along guide rails 28A and 28B, which extend fixed to the vehicle along the lateral edges of the roof opening 12, under the rear fixed roof section 26.

The displacement device is explained below only with reference to the displacement device region which is arranged on the left in the forward direction of travel. The displacement device region which is arranged on the right in the forward direction of travel is formed correspondingly thereto mirror-symmetrically with respect to the longitudinal center plane of the vehicle.

Figure 5:
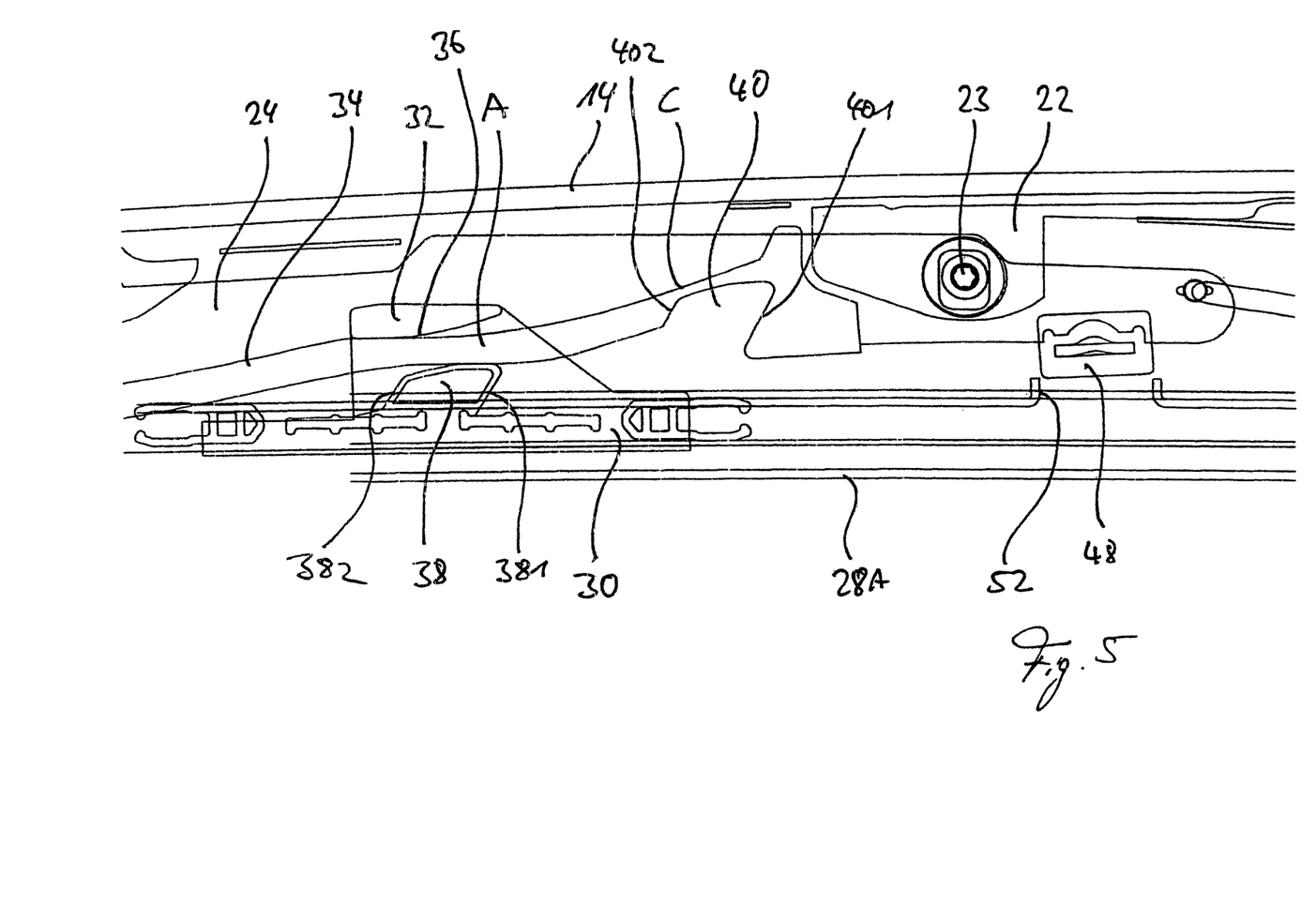
FIG. 5 shows an enlarged view of a rear section of the cover element in the closed position thereof together with a drive carriage.
Figure 6:
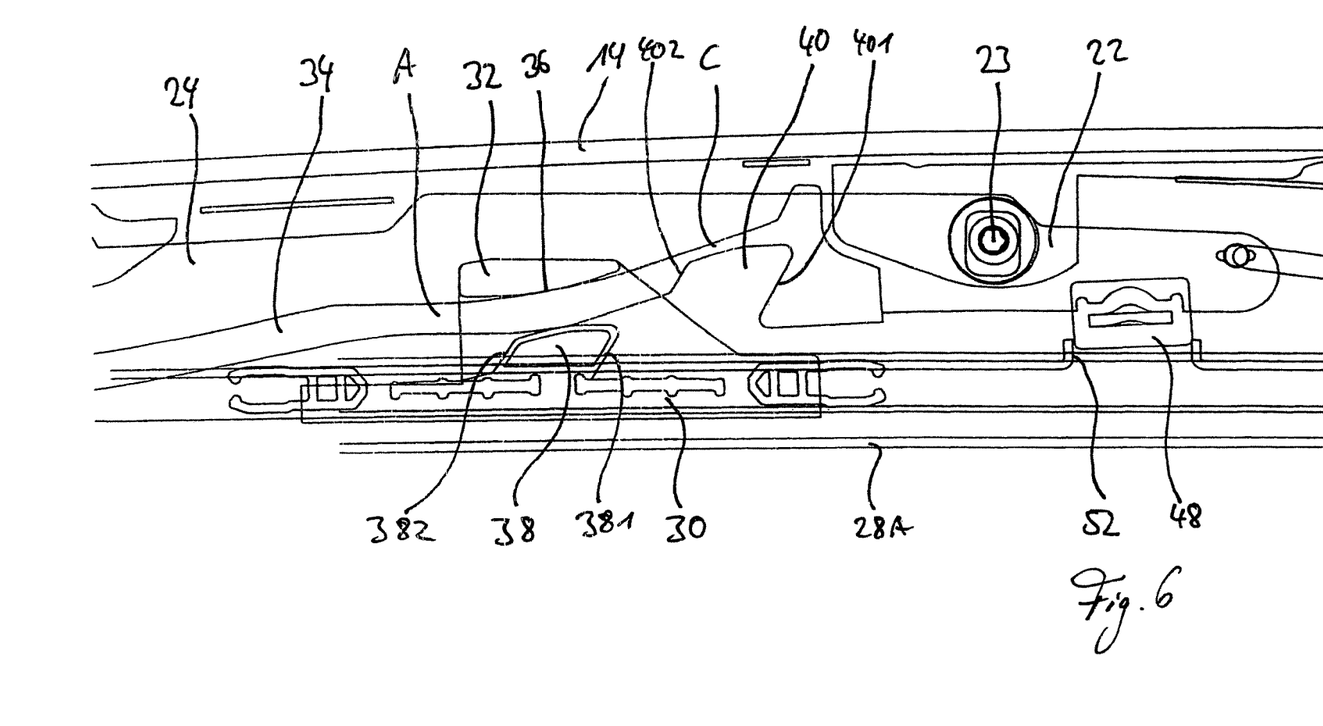
FIG. 6 shows a view corresponding to FIG. 5 but with a slightly lowered cover element.
Figure 7:
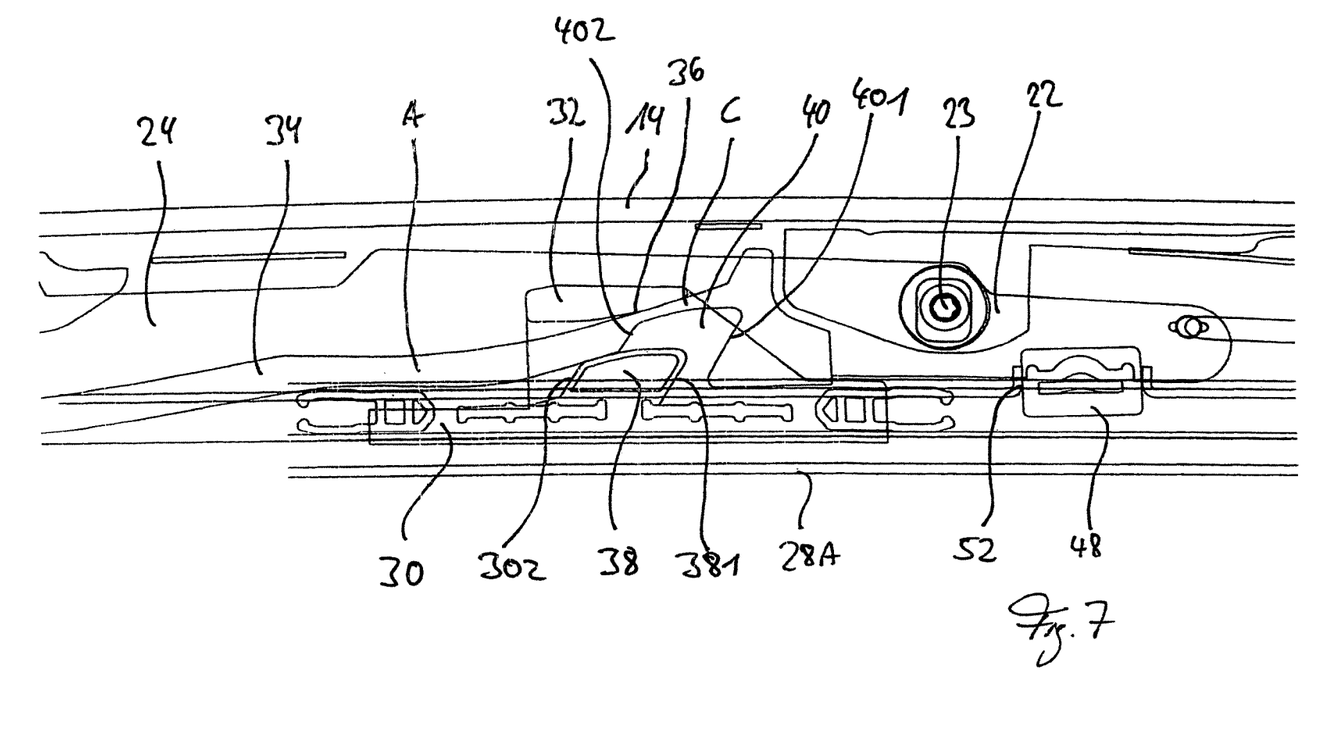
FIG. 7 likewise shows a view corresponding to FIG. 5, but with the cover element lowered even further in comparison to FIG. 6.
Figure 8:
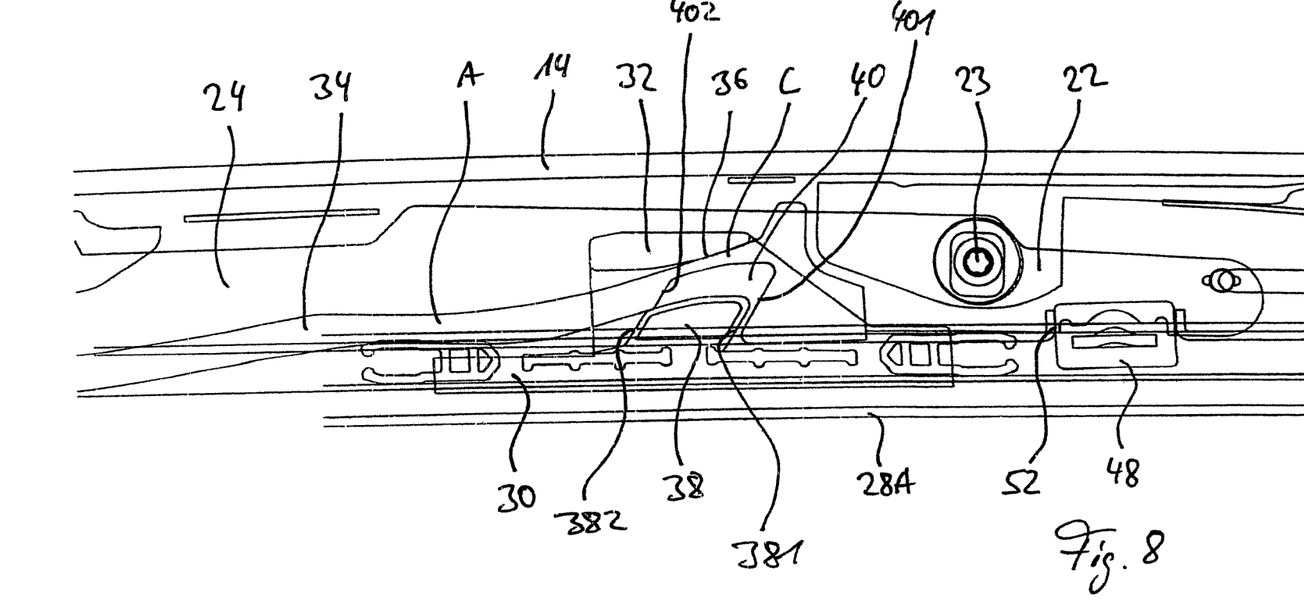
FIG. 8 likewise shows a view corresponding to FIG. 5, but shortly before a carry-along recess of the cover element is reached.

The displacement device comprises a drive carriage 30 on both sides of the longitudinal center plane of the vehicle, said drive carriage being guided displaceably in the longitudinal direction of the vehicle in the guide rail 28A and being driven by means of a pressure-resistant driving cable (not illustrated specifically here). The drive carriage 30 is a plastic injection molded component and comprises a claw section 32 which engages around a guide web 34 which is formed on the lower side of the cover element carrier 24 and constitutes a plastic insert molding of the cover element carrier 24 which is otherwise manufactured from steel. The cover element carrier 24 thus has a substantially T-shaped cross section. A vertical section 35 of the cover element carrier 24 reaches through a gap, which is formed by the claw section 32, on the upper side of the drive carriage 30.

The claw section 32 of the drive carriage 30 comprises an upper guide surface 36, which bears against the upper side of the guide web 34, and a guide element 38, which forms a lower guide surface 383, on which the guide web 34 rests. The guide element 38 has a front boundary surface 382 and a rear boundary surface 381 which are each inclined in the rear direction of the vehicle and are connected to each other via the guide surface 383 which is of curved design and bears against the lower side of the guide web 34.

The plastic insert molding which forms the guide web has a multiply curved profile such that movement of the drive carriage 30 in the guide rail 28A causes pivoting of the cover element 14 by interaction of the guide web 34 with the upper guide surface 36 and with the guide surface formed by the guide element 38. In a rear section, the guide web 34 is provided with a "carry-along recess" 40, the shape of which, in the longitudinal direction of the vehicle, corresponds to the shape of the guide element 38 of the drive carriage 30 in the longitudinal direction of the vehicle. The carry-along recess 40 is formed by a tapering of the material of the guide web 34 in the vertical direction of the vehicle. As can be gathered from FIG. 4, in the lowered displacement position of the cover element 14, the guide element 38 enters the carry-along recess 40 as a carry-along element. The carry-along recess consequently also has a front boundary surface 402 and a rear boundary surface 401 which are each inclined in the direction of the vehicle rear.

Furthermore, in addition to a front slide 42, which is guided in a guide channel 44 of the guide rail 28A and defines a pivot axis of the cover element 14, the carrier element 24 has a front locking element 46 and a rear locking element 48 which each protrude in the transverse direction of the vehicle and, upon pivoting of the cover element 14, secure the latter against moving in the longitudinal direction of the vehicle by interaction with upper recesses 50 and 52, respectively, of the guide rail 28A. In the displacement position which is illustrated in FIG. 4, i.e. in the lowered position of the cover element 14, the locking elements 46 and 48 are arranged in a guide channel 54 of the guide rail 28A such that they secure the cover element 14 during the movement thereof in the longitudinal direction of the vehicle against pivoting about an axis which is arranged in the region of a front edge and extends in the transverse direction of the vehicle.

The roof opening system illustrated in the drawing operates in the manner described below.

Starting from the closed position of the cover element 14, which position is illustrated in FIG. 2 and in which the claw section 32 of the drive carriage 30 rests in a substantially horizontal region A of the guide web 34, the drive carriage 30, as the cover element 14 pivots into the ventilation position thereof, which is illustrated in FIG. 3, is moved in the direction of the front of the vehicle into a region B of the guide web 34, which region drops in the direction of the front of the vehicle in relation to the region A such that, by interaction of the claw section 32 of the guide web 34, which drops substantially as viewed from the vehicle rear, the rear edge of the cover element 14 is deployed upward in relation to the fixed roof section 26.

Figure 9:
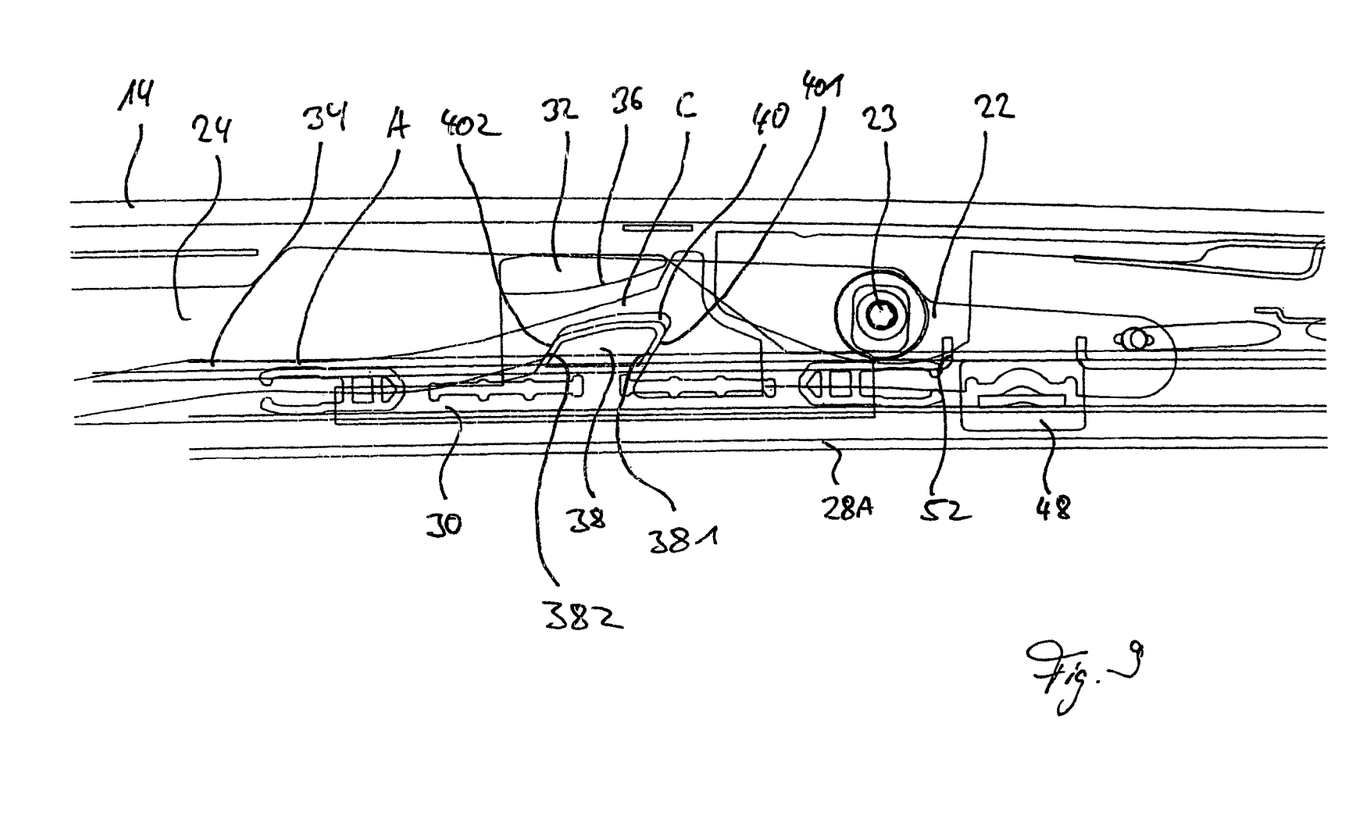
FIG. 9 likewise shows a view corresponding to FIG. 5, but as a carry-along element enters the carry-along recess.
Figure 10:
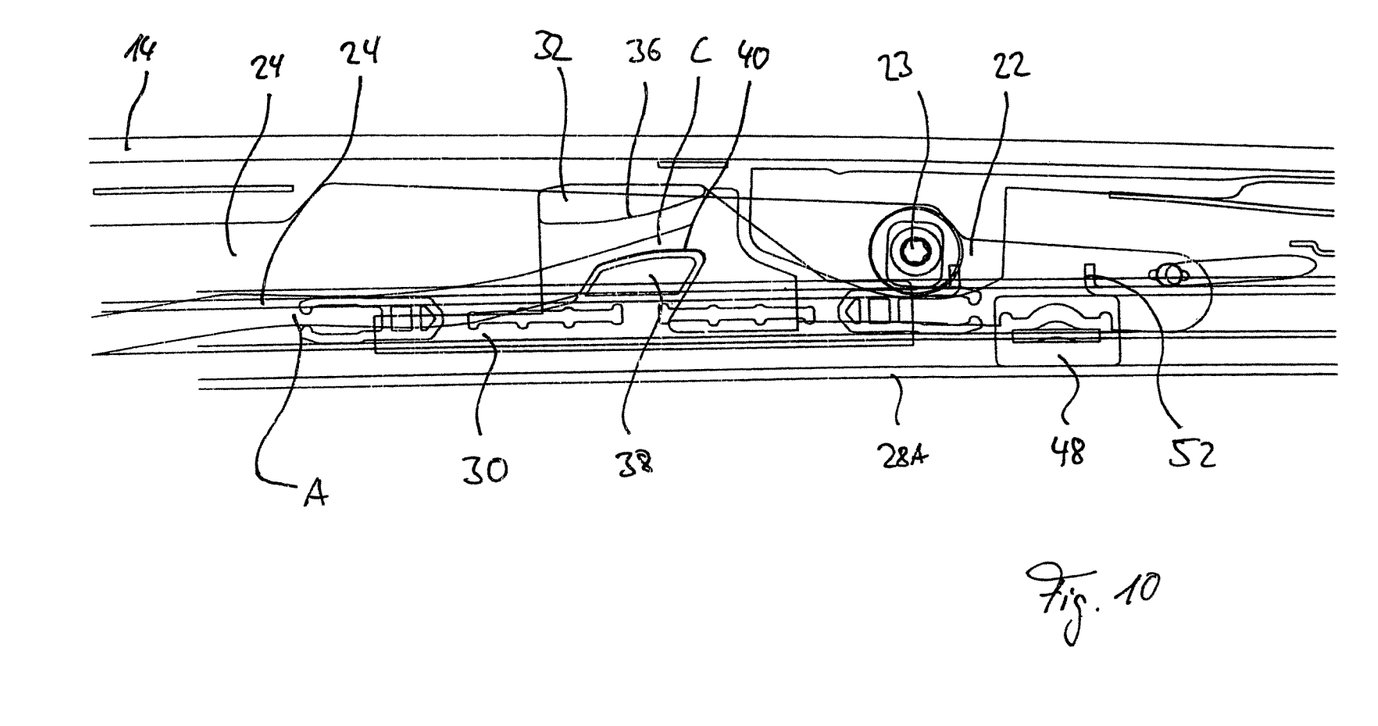
FIG. 10 likewise shows a view corresponding to FIG. 5, but after reaching the lowered displacement position of the cover element.

If, in order to open up the roof opening 12, the cover element 14 is to be moved under the rear fixed roof section 26, the drive carriage 30 is likewise moved from the closed position, which is illustrated in FIG. 2, in the direction of the vehicle rear into a region C of the guide web 34, which region rises in the direction of the vehicle rear in relation to the central region A such that the guide element 38 slides along the lower edge of the guide web 34 and enters the carry-along recess 40. The movement sequence taking place in this case is illustrated in a stepwise manner in FIGS. 5 to 10. At the beginning of the entry operation, the rear surface 381 of the guide element 38 strikes against the rear boundary surface 401 of the carry-along recess 40. By means of the respective orientation of said surfaces 381, 401 in a manner inclined in the direction of the vehicle rear, as the drive carriage 30 moves further in the rear direction, the cover element carrier 24 slides downward along the surface 381 such that the cover element 14 is pivoted about the pivot axis, which is formed by the front slide 42, and is lowered. When the guide element 38 enters the carry-along recess 40, the upper guide surface 36 is moved away from the guide web 34 (c.f. FIGS. 4, 9 and 10). By this means, the cover element 14 is lowered below the level of the fixed roof section 26 such that the locking elements 46 and 48 lie outside the upper recesses 15 and 52 of the guide rail 28A and completely in the guide channel 54 of the guide rail 28A. Upon further movement of the drive carriage 30, the guide element 38, which is located in the carry-along recess 40 of the plastic insert molding forming the guide web 34, then acts as a carry-along means which causes the cover element 14 to move in the longitudinal direction of the vehicle. The guide element of the drive carriage 30 therefore controls the guide web 34 of the cover element carrier 24 such that the locking element 46 and 48 pass with precision through the recesses 50 and 52 of the guide rail 28 and enter the guide channel 54 of the guide rail 28A, and the cover element 14 can be moved. During closing of the roof opening 12, i.e. when the cover element 14 is moved from the moved-back open position to the closed position, the pivoting movement of the cover element 14 is triggered, after a front stop of the cover element 14 is reached, by the interaction of the front boundary surface 382 of the guide element 38 and the front boundary surface 402 of the carry-along recess. The cover element is thus pivoted upward into the closed position thereof which closes the roof opening 12. The guide element 38 of the drive carriage 30 is then located again in the region A of the guide web 34.

LIST OF REFERENCE NUMBERS

10 Vehicle roof
12 Roof opening
14 Cover element
16 Glass body
18 Frame
20 Inner cover panel
22 Fastening tabs
23 Screw
24 Cover element carrier
26 Roof section
28A, B Guide rails
30 Drive carriage
32 Claw section
34 Guide web
36 Upper guide surface
38 Guide element
381 Boundary surface
382 Boundary surface
383 Guide surface
40 Carry-along recess
401 Boundary surface
402 Boundary surface
42 Slide
44 Guide channel
46 Locking element
48 Locking element
50 Recess
52 Recess
54 Guide channel

The invention claimed is:

1. A vehicle roof with at least one cover element that optionally closes or at least partially opens up a roof opening and has a carrier element on two sides of a longitudinal center plane of the vehicle,
the carrier element comprising a guide web that interacts with a displacement device that is guided in a guide rail and comprises a drive carriage, which interacts with the guide web at least to pivot the cover element and comprises a guide element on which the guide web rests, wherein, as the cover element moves in the longitudinal direction of the vehicle, each guide element of the drive carriage serves as a carry-along element that engages in a corresponding carry-along recess formed on the respectively assigned carrier element of the cover element, wherein each carry-along recess has a front boundary surface and a rear boundary surface, each said boundary surface being inclined upwardly in a rear direction of the vehicle to ensure a positionally precise entry and exit of the respective guide element of the respective drive carriage into and out of the respective carry-along recess.

2. The vehicle roof as claimed in claim 1, wherein the carry-along recesses are each formed by a plastic insert molding of the respective carrier element, said plastic insert molding forming the guide web formed on the respective carrier element.

3. The vehicle roof as claimed in claim 2, wherein the plastic insert molding is tapered in a vertical direction of the vehicle in the region of the carry-along recess.

4. The vehicle roof as claimed in claim 1, wherein a front locking element and a rear locking element are formed on the carrier element, which front and rear locking elements secure the cover element during pivoting thereof and in the closed position thereof against moving in the longitudinal direction of the vehicle and, as the cover element moves, are guided in a guide channel of the respective guide rail and secure the cover element against pivoting.

5. The vehicle roof as claimed in claim 4, wherein the front and rear locking elements each interact with a recess of the guide rail.

6. The vehicle roof as claimed in claim 1, wherein the drive carriages are each a plastic injection-molded part.

* * * * *

UNITED STATES PATENT AND TRADEMARK OFFICE
CERTIFICATE OF CORRECTION

PATENT NO.        : 8,500,193 B2
APPLICATION NO. : 13/148627
DATED             : August 6, 2013
INVENTOR(S)       : Faerber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 9 days.

Signed and Sealed this
Fifteenth Day of September, 2015

Michelle K. Lee
*Director of the United States Patent and Trademark Office*